J. F. GORDON.
KINETOSCOPIC SHUTTER.
APPLICATION FILED JUNE 27, 1919.
1,340,887.
Patented May 25, 1920.
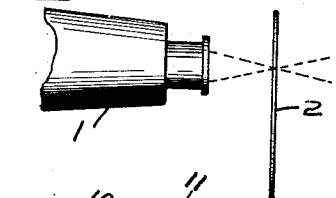
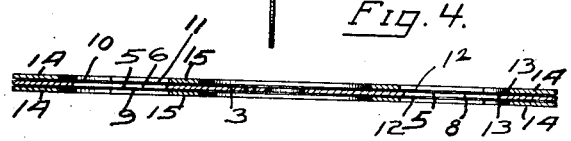
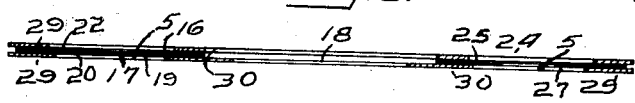
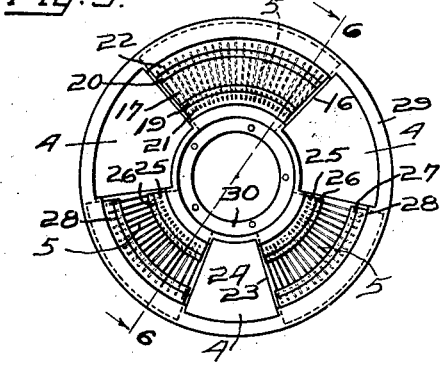
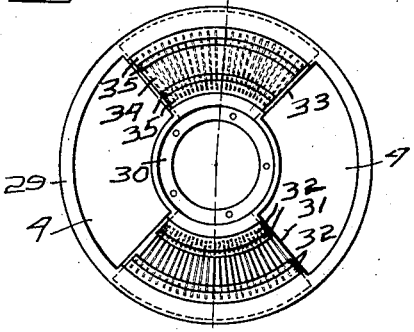
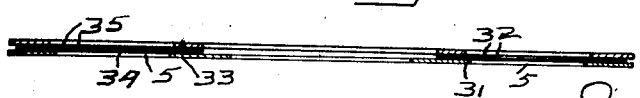
INVENTOR
James F. Gordon
by
Owen Owen Crampton

UNITED STATES PATENT OFFICE.

JAMES F. GORDON, OF TOLEDO, OHIO.

KINETOSCOPIC SHUTTER.

1,340,887. Specification of Letters Patent. Patented May 25, 1920.

Application filed June 27, 1919. Serial No. 307,192.

*To all whom it may concern:*

Be it known that I, JAMES F. GORDON, a citizen of the United States, and a resident of Toledo, in the county of Lucas and State of Ohio, have invented a certain new and useful Kinetoscopic Shutter; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object improvements in shutters used in moving picture projection machines for reducing the flicker caused by the shutting off of the light from the screen during the periods in which the change of the film, on which the picture is located, occurs. By my invention is provided a means whereby the light is softened and diffused with the result that the unpleasant effect on the eye of the observer of a projected picture is greatly reduced.

The invention may be contained in any form of a shutter and may be used in connection with any form of projection apparatus. For purposes of illustrating the practical application of my invention I have selected one or two shutters containing the invention which are illustrative of shutters of different forms that contain my invention. The shutters selected are illustrated in the accompanying drawings.

Figure 1 illustrates, somewhat conventionally, the arrangement of a condenser of a projecting apparatus and the shutter. Figs. 2 and 3 illustrate the sides of a shutter containing my invention. Fig. 4 illustrates a sectional view of the shutter illustrated in Figs. 2 and 3 taken on the line 4, 4 indicated in Fig. 3. Fig. 4 is a somewhat exaggerated view in order to illustrate the relative location of the parts. Fig. 5 illustrates a modified form of shutter that is used in connection with picture projecting apparatus having a source of direct current for producing the light necessary for the projection of the pictures. Fig. 6 is a sectional view taken on the line 6, 6 indicated in Fig. 5. Fig. 7 illustrates a shutter of the same type as that shown in Fig. 5 but one that is used in connection with a projection apparatus which has a source of alternating current for the production of the light necessary for the projection of the picture. Fig. 8 is a sectional view taken on the line 8, 8 indicated in Fig. 7.

In Fig. 1, 1 is the condenser of the projection apparatus and 2 is the shutter which is mounted on a suitable shaft in any suitable way and is rotated by the apparatus synchronously with the shifting of the film having the pictures projected, in a manner well known in the art.

In the form of shutter illustrated in Figs. 2, 3 and 4, 3 is a disk having a plurality of arcuate slots 4 formed therein. Where the shutter is used in connection with apparatus operated by direct currents three of such slots are formed in the disk, but where the shutter is used in connection with alternating current operated machines two of such slots are formed in the disk. In the remaining portions of the disk and in the line of the circle of the arcuate slots are formed a plurality of radiating slots 5. Any number of the slots 5 may be used, to the inch, necessary for allowing the required amount of light and yet at the same time softening to a certain extent the light that is used in projecting the pictures. The connected bars that are thus formed integral in the disk by cutting the slots radially from the center of the disk, operate on the light in the same manner that the segment operates on the light to cut it off as in the ordinary solid shutter. That is, in a rotation of the disk the leading edge of the ordinary solid shutter moves at right angles to the axis of the light and extends in a direction at right angles to the axis of the light when cutting the light off, and in my invention the transverse bars operate on the light in the same manner to rapidly intermittently cut the light off and thus produce a uniform effect on the eye throughout the operation of the shutter and at the same time to greatly soften the light and eliminate the flickering that is produced by shutters now known in the art.

The slots 5 may be made to extend to any radial length within the limitations of the length of the radius of the disk, in order that all of the light, including any deflected light, coming from the apparatus, may be operated upon by the shutter. The segments 6, 7 and 8 of the shutter having the slots 5 are covered more or less by a suitable translucent material. The segment 6 of the shutter shown in Figs. 2 and 3 is the segment that cuts off the light when the picture is changed in the machine, while the segments 7 and 8 operate to reduce the intensity of the light and in a measure to reduce the flickering. The segment 6 may be covered on both sides by a suitable translucent material or it may be covered on but one side with the translucent material. In the form shown in Fig. 2 the segment 6 is completely covered on one side by a segment of mica 9 except at the very edges of the segment 6. The radial edges of the segment of mica 9 are set back somewhat from the corresponding edges of the segment 6 to prevent undue flaking or wear of the edges of the segment 9. The mica thus completely covers the slots 5 located in the segment 6 on one side of the segment. On the other side of the segment, as shown in Fig. 3, the slots 5 are covered by arcuate strips of mica 10 and 11 that extend over portions of the ends of the slots 5. The thickness of the mica strips 10 and 11 along their inner edges with reference to the slots, that is, the inner edge of the strip 10 with reference to the axis of the disk 3 and the outer edge of the strip 11 with reference to the axis of the disk 3, may be varied, that is, may be made thinner as they approach the edges, or layers of mica may be used in producing the variable thickness of the portion of the mica along the inner edges with reference to the slots 5. The strips 10 and 11 may extend toward each other any suitable distance in order to produce the desired effect on the light. However, it is preferable to cover a considerable portion of the ends of the slots 5 by the strips 10 and 11. In order to present an increased translucent medium for the transmission of the light the mica segment 9 may be roughened, such as by emery paper. This may also be done in connection with the mica strips 10 and 11. In the preferred form of the construction, however, the segment 9 alone is thus slightly roughened to render it translucent.

The segments 7 and 8 are also covered more or less with a translucent material. In the form of the construction shown a considerable portion of the ends only of the slots 5 are covered with semi-transparent material on both sides of the disk. The semi-transparent material may be varied in its translucency to produce different softening effects on the light. To modify the translucency the surface of the mica may be roughened more or less. The translucency also may be varied from the inner edges to the outer edges, with reference to the slots, by subjecting the strips to a varying amount of roughening. In the preferred form of the construction, however, the strips 12 and 13 are made of mica without roughening the surface, the semi-translucency of the mica being sufficient to soften the light without roughening the surface to render them more translucent.

The strips 9, 10, 11, 12 and 13 are maintained in position on the disk 3 by any suitable means, such as by the clamping rings 14 that are secured to the outer edges of the disk 3 and the clamping rings 15 that are secured to the disk within the radius of the inner ends of the slots 5. The clamping rings 14 and 15 on opposite sides are secured to each other or to the disk 3 by any suitable means.

In the form of the construction illustrated in Figs. 5, 6, 7 and 8 the translucent material or medium is located on one side of each of the disks and layers of the translucent material are provided so as to graduate the softening effect on the light. The overlapping or overextending layers, however, may be located on opposite sides of the disk in each case, as in the form of the construction illustrated in Figs. 2 and 3. The disk illustrated in Fig. 5 is to be used in connection with moving picture machines which are operated by direct current. The segment 16 is the segment that cuts off the light to a large extent when the picture is being changed in the machine. It is provided with a segment of translucent material 17 that extends to near the radial edges of the segment 16 of the disk 18. The portions along the circular edges of the segment 17 are covered with strips of arcuate translucent material 19 and 20. The circular edges of the segment 17 may also be covered with a second layer of semi-transparent material. In the form of construction shown arcuate strips of translucent material 21 and 22 are located respectively within and without the edges of the strips 19 and 20 and yet so as to cover portions of the ends of the slots 5 that are formed in the segment 16. The segment 17 and the strips 19, 20, 21 and 22 may be formed of mica and in order to regulate their translucency they may be roughened to a suitable extent by means of emery paper. In the form of the construction shown the segment 17 alone is thus roughened while the strips of mica are sufficiently semi-transparent to be used without roughening or rendering them less transparent.

The segments 23 and 24 that are also provided with the slots 5 have strips 25, 26, 27 and 28 arranged and constructed substantially in the same manner that the strips 19, 20, 21 and 22 are arranged with reference to the segment 16 and these strips may be modified as to their width and as to their translucency in the same manner that the strips 19, 20, 21 and 22 may be modified. The strips and segment 17 may be secured to the disk 18 by means of the clamping rings 29 and 30 that clamp the outer and inner edges, with reference to the axis of the disk, of the segment and strips or, if desired, the edges of the disk 18 may be turned over so as to clamp the circular edges of the segment and strips.

The construction of the disk illustrated in Fig. 7 is substantially the same as that of the disk illustrated in Fig. 5 except that in place of the segments 23 and 24 of the disk shown in Fig. 5 the disk in Fig. 7 is provided with a single segment 31 which is provided with the strips 32 similar in form and arrangement to the strips located on the segments 23 and 24 in the form of construction shown in Fig. 5. The segment 33 is substantially the same as the segment 16 of the disk 18 it being provided with the segment of translucent material 34 and the strips of semi-transparent material 35. The segment 34 and the strips 35 are arranged substantially the same as the corresponding segment and strips of semi-transparent or translucent material of the segment 16 of the disk 18 and may be constructed and modified in the same manner as the strips and segment of the disk 18.

I claim:

1. In a kinetoscopic shutter, a segment for reducing the rays of light of the kinetoscope, the segment having a layer of translucent material extending across the field of light, and additional layers extending from a short distance from opposite sides of the axis of the cone of light projected by the kinetoscope to beyond the cone of light.

2. In a kinetoscopic shutter, a segment for reducing the rays of light of the kinetoscope, the segment having a layer of translucent material extending across the cone of light projected by the kinetoscope, and additional layers of translucent material extending from different points on opposite sides of the axis of the cone of light to beyond the cone of light.

3. In a kinetoscopic shutter, a segment for reducing the light, the segment having layers of translucent material extending from short distances on opposite sides of the cone of light projected by the kinetoscope to beyond the cone of light.

4. In a kinetoscopic shutter, a segment for reducing the light, the segment having layers of translucent material extending from different points on opposite sides of the axis of the cone of light projected by the kinetoscope to beyond the cone of light.

5. In a kinetoscopic shutter having a plurality of segments for cutting off the light, one of the segments having a plurality of radiating slots, a translucent material covering the slots, and means for varying the translucency of the translucent material in a radial direction from the circle passing through the center of the segment.

In testimony whereof I have hereunto signed my name to this specification.

JAMES F. GORDON.